(12) United States Patent
Hamaekers et al.

(10) Patent No.: US 6,474,430 B2
(45) Date of Patent: Nov. 5, 2002

(54) MOUNT FOR MOUNTING A CAB ON A VEHICLE FRAME

(75) Inventors: Arno Hamaekers, Gorxheimertal; Arnold Simuttis, Bad Kreuznach; Axel Rudolph, Seeheim/Jugenheim, all of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/829,740

(22) Filed: Apr. 10, 2001

(65) Prior Publication Data
US 2001/0047898 A1 Dec. 6, 2001

(30) Foreign Application Priority Data
Apr. 11, 2000 (DE) .......................... 100 17 858

(51) Int. Cl.[7] .......................... B62D 33/06; B62D 7/00; B60G 7/00; B60P 7/00; B60J 7/00
(52) U.S. Cl. .......................... 180/89.14; 280/124.177; 296/190.07
(58) Field of Search .......................... 180/89.12, 89.13, 180/89.14; 296/190.07; 280/124.109, 124.177; 267/293

(56) References Cited

U.S. PATENT DOCUMENTS

| | | | |
|---|---|---|---|
| 3,823,976 A | * | 7/1974 | McMillen |
| 4,014,588 A | * | 3/1977 | Kohriyama |
| 4,085,960 A | * | 4/1978 | Sherman |
| 4,210,362 A | * | 7/1980 | Boersma |
| 4,294,324 A | * | 10/1981 | Kimball et al. |
| 4,451,079 A | * | 5/1984 | Takahashi |
| 5,984,036 A | * | 11/1999 | Higuchi et al. |
| 6,062,763 A | * | 5/2000 | Sirois et al. |

FOREIGN PATENT DOCUMENTS

| | | | |
|---|---|---|---|
| JP | 6-16152 | * | 1/1994 |
| WO | 97/08038 | | 3/1997 |

* cited by examiner

Primary Examiner—Paul N. Dickson
Assistant Examiner—Joselynn Y. Sliteris
(74) Attorney, Agent, or Firm—Kenyon & Kenyon

(57) ABSTRACT

A mount for mounting a cab on a vehicle frame includes a first and a second mounting part, one of which is provided on the cab and the other of which is provided on the frame. The mount further includes a vibration damper acting between frame and cab. The first mounting part includes an inner anchoring part and an outer anchoring part that is movable with respect to the inner anchoring part, the outer anchoring part radially enclosing the inner anchoring part, an elastic spring element acting between the inner and the outer anchoring parts, the cab being raiseable with respect to the vehicle frame, e.g., in a swiveling manner, from a driving position into a service position, and being lowerable from the service position into the driving position. In response to raising the cab into the service position, the first and the second mounting parts are separated from each other, and, in response to lowering the cab into the driving position, the first and second mounting parts are reconnected. In the driving position, the first mounting part is accommodated in a receptacle formed on the inner anchoring part. A centering device is provided, which aligns the first mounting part with respect to the second mounting part in response to the cab being lowered into the driving position.

22 Claims, 2 Drawing Sheets

MOUNT FOR MOUNTING A CAB ON A VEHICLE FRAME

FIELD OF THE INVENTION

The present invention relates to a mount for mounting a cab on a vehicle frame, having a first and a second mount part, one of these being provided on the cab, and the other being provided on the vehicle frame, and having a vibration damper acting between the frame and the cab. The first mount part includes an inner anchoring part and an outer anchoring part that is movable with respect to the inner anchoring part, the outer anchoring part radially enclosing the inner anchoring part, and an elastic spring element acting between the inner and the outer anchoring parts.

BACKGROUND INFORMATION

A mount for mounting a cab on a vehicle frame is described, for example, in International Published Patent Application No. WO 97/08038. The mount includes a rubber bearing provided between the frame and the cab, the radially external part of the rubber mount being joined to the cab by a plurality of bolts, and the radially internal part of the rubber mount being joined to the frame by a bolt. A shock absorber and a spring acting in parallel thereto are disposed between the rubber mount and the vehicle frame. The mount is not designed in a manner allowing it to be detached using simple means, e.g., by raising the cab, in order to facilitate service and maintenance measures. In addition, the mount has the disadvantage of its manufacture and assembly being costly due to a complex design, which includes a rubber member, a separate spring, as well as a separate shock absorber.

SUMMARY

It is an object of the present invention to provide a mount that facilitates the performance of service measures and that may be manufactured inexpensively and assembled easily.

The above and other beneficial objects of the present invention are achieved by providing a mount with which the cab may be raised relatively to the frame, e.g., in a swivelling manner, from a driving position into a service position and may be lowered from the service position into the driving position. The first and second mount parts are separated from each other in response to raising the cab into the service position and are joined again in response to lowering the cab into the driving position. In the driving position, the first mount part is positioned in a receptacle formed on the inner anchoring part. A centering device is provided, which aligns the first mount part with respect to the second mount part in response to the cab being lowered into the driving position.

The arrangement according to the present invention attains an especially high degree of serviceability, in that the cab, e.g., of a truck, may be raised relatively to the vehicle frame, into a service position. Two first mount parts may be positioned to the left and right of the longitudinal vehicle axis, between the cab and the frame. The cab may be moved about a pivot located in its front region, from the driving position into the raised service position. In addition, the arrangement according to the present invention allows a particularly compact method of construction, since the first mount part unites a plurality of functions, for which several separate component parts were necessary in the conventional mount.

A particularly sturdy arrangement is achieved by forming the first mount part as a lug, at least a section of which may be accommodated in the receptacle.

A particularly simple arrangement is achieved, in that the centering device includes a first guide surface formed on the first mount part and a second guide surface, which is formed on the receptacle and interacts with this first guide surface.

A further aspect of the present invention provides for the first and/or the second guide surface being inclined so that the first mount part is centered upon being inserted into the receptacle.

The mount may be manufactured in a particularly inexpensive manner, when the inner anchoring part is in the form of a ring, the annular opening of which forms the receptacle.

A particularly simple and compact method of construction may be achieved, in that at least a section of the ring includes a diameter that decreases, e.g., in a conical manner, in the insertion direction of the first mount part.

Undesired play between the cab and the vehicle frame may be prevented by providing a section on the side of the ring facing the cab, the section being radially enlarged in the external direction and forming a seat for a supporting body.

A locking mechanism may be provided, which secures the cab in the driving position.

A particularly stable manner of locking is achieved in that the locking mechanism includes a locking element that grips the segment radially enlarged in the external direction, from behind.

Another advantageous manner of locking consists in the locking mechanism having a locking element, which acts between the second mount part and the inner anchoring part.

An additional improvement may be attained by providing a section on the side of the ring opposite to the cab, the section being radially enlarged in the external direction and defining, together with the outer anchoring part, a breakaway prevention mechanism. This prevents the cab from moving excessively with respect to the vehicle frame, even in response to the elastic spring element failing, e.g., as a result of an accident.

An improvement in the vibration isolation of the cab is achieved by providing a hydraulic shock absorber that acts between the first and second mount parts.

For hydraulic damping, a further aspect of the present invention provides a first chamber filled with hydraulic fluid and a second chamber, which is separated from the first chamber, and is in fluid communication with the first chamber via a duct. The volume of the first chamber is changed in response to a relative movement of the first and second mount parts so that hydraulic fluid is moved in the duct between the first and second chambers. Such an arrangement may reduce occurring vibrations.

A particularly compact design is attained by arranging the first chamber and/or the second chamber between the inner and the outer anchoring parts.

At least a section of the first chamber may be bounded by the elastic spring element.

The duct may be formed by a gap bounded by the inner anchoring part and the outer anchoring part.

To form the gap, the outer anchoring part may include a choke or throttle element, which extends around the inner anchoring part.

Elasticity may be attained in the transverse direction, in that the throttle element is made of elastic material and is especially formed in one piece with the elastic spring element. The one-piece design of the elastomeric spring element and throttle element may reduce the manufacturing costs further.

Improved vibration isolation may be achieved, in that the throttle element includes a substantially cylindrical section pointing toward the second chamber, the bottom surface of the cylindrical section having an opening therein which, together with the inner anchoring part, forms the gap.

DETAILED DESCRIPTION

Figure 1:
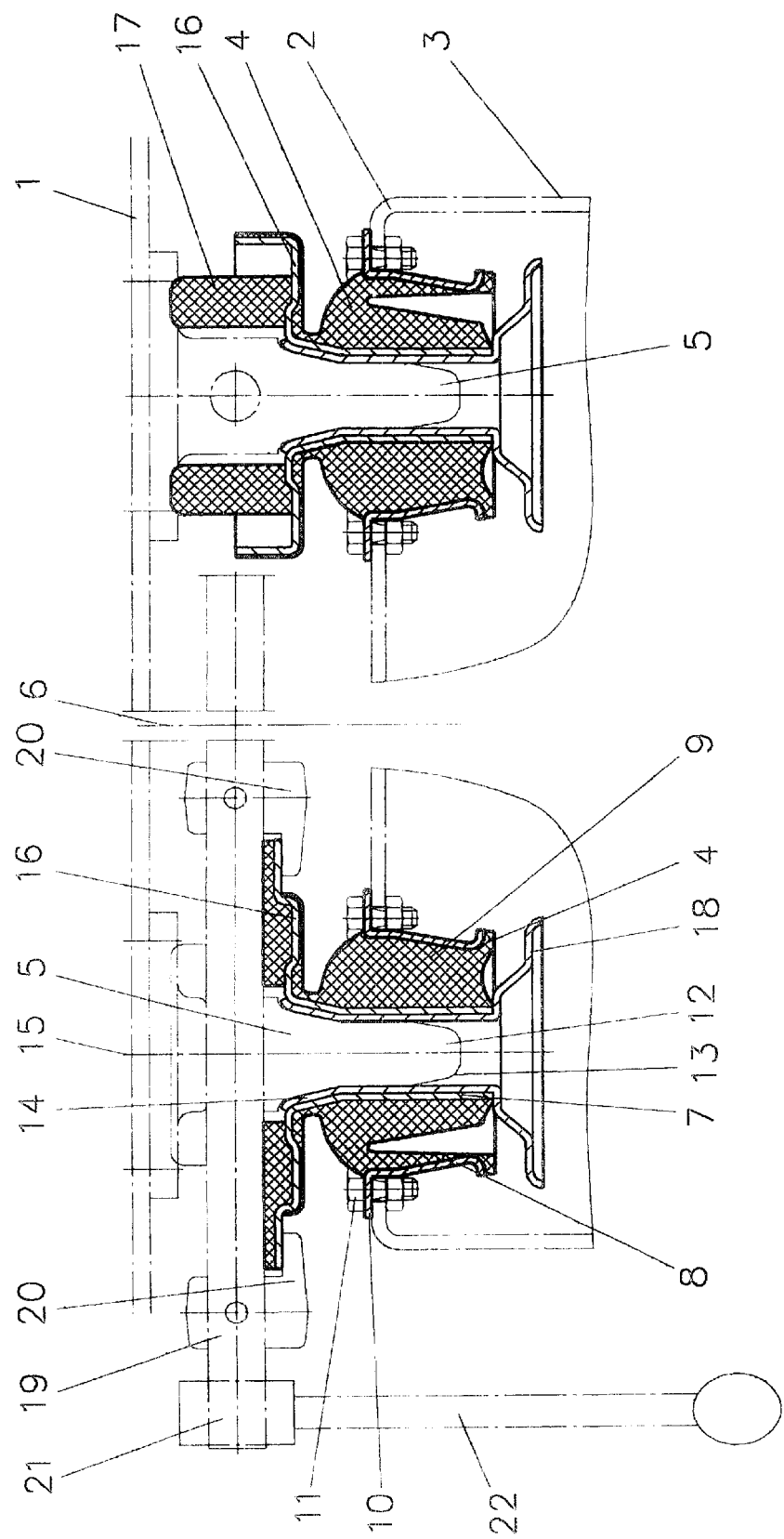
FIG. 1 illustrates a first example embodiment of a mount for mounting a cab on a vehicle frame according to the present invention.

FIG. 1 illustrates a lower section of a cab 1, which is mounted to a supporting section 2 of vehicle frame 3 facing cab 1. In a rear section of cab 1, a first mount part 4 is provided, which is fastened to supporting section 2 of frame 3, and a second mount part 5 is provided, which is fastened to cab 1. In order to absorb the occurring forces more effectively, a first mount part 4 and a second mount part 5 are mounted on both sides of vertical, vehicle center axis 6.

Using an axis of rotation (not shown) located in the front region of cab 1, cab 1 may be raised from the driving position illustrated in FIG. 1, into a service position, and may be lowered from the service position into the driving position again. First mount part 4 and second mount part 5 are separated from each other in response to cab 1 being raised into the service position and are reunited in response to the cab being lowered into the driving position.

First mount part 4 is in the form of a sleeve bearing, which includes an inner anchoring part 7 and an outer anchoring part 8 that can move relatively to inner anchoring part 7, radially external anchoring part 8 radially enclosing inner anchoring part 7. An elastic spring element 9 formed of an elastomer is disposed between inner and outer anchoring parts 7, 8. Outer anchoring part 8 is in the form of a ring, which is joined, through a flange 10 bent toward the outside, to supporting section during opening 2 of vehicle frame 3, using connecting device 11 in the form of bolts.

Inner anchoring part 7 is in the form of ring, the annular opening of which defines a receptacle for second mount part 5.

Second mount part 5 is in the form of a lug, a section of which is accommodated in the receptacle formed by inner anchoring part 7, when cab 1 is in the driving position.

In addition, the mount according to the present invention includes a centering device which, in response to cab 1 being lowered from the service position into the driving position, aligns first mount part 4 with respect to second mount part 5 so that it can be accommodated in the receptacle. A first guide surface 13 is formed on second mount part 5, and a second guide surface 14 is formed on inner anchoring part 7, the first and second guide surfaces interacting and assuring that cab 1 is centered while lowering it. Guide surfaces 13, 14, which may be configured in a rotationally symmetric manner, are inclined with respect to lug axis 15, so that second mount part 5 is centered upon being inserted into the receptacle. Sections of both inner anchoring part 7 formed as a ring and lug 12 include a diameter that conically decreases in the insertion direction of first mount part 4.

Furthermore, a section 16, which is radially expanded in the external direction and defines a seat for a supporting body 17, is formed on the side of inner anchoring part 7 facing cab 1. In the driving position of cab 1, supporting body resting against both cab 1 and section 16 is prestressed by the weight of the cab, and thus prevents unwanted movement between cab 1 and inner anchoring part 7.

A segment 18 radially enlarged in the external direction is provided on the side of inner anchoring part 7 facing away from cab 1. The outer diameter of this segment 18 formed in a rotationally symmetric manner is at least as large as the outer diameter of outer anchoring part 8, so that segment 18 and outer anchoring part 8 together form a break-away prevention mechanism.

To hold cab 1 securely in the driving position illustrated in FIG. 1, a locking mechanism 19 is provided, by which cab 1 is fixed in the driving position. Locking mechanism 19 includes a locking element 20, which grips from behind, the section 16 of inner anchoring part 7 from behind, the section being radially expanded in the external direction.

Using a spindle 21 that may be actuated by a lever 22, locking element 20 may be rotated from its locking position illustrated in FIG. 1, into a release position, in which cab 1 may be raised into the service position. As an alternative, a locking mechanism having a locking element may also be configured to act between lug 12 and inner anchoring part 7 (not shown).

Figure 2:
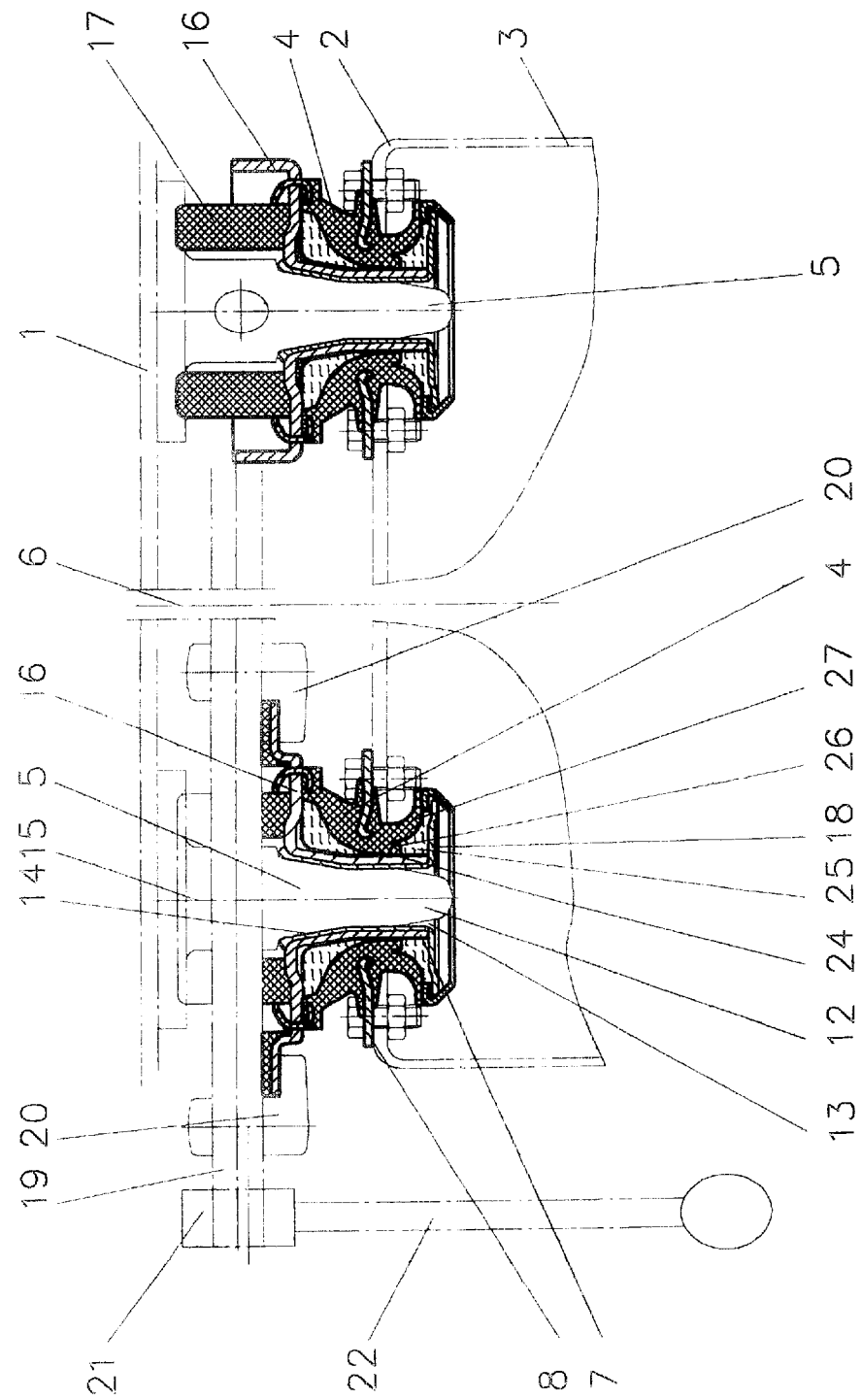
FIG. 2 illustrates a second example embodiment of a mount for mounting a cab on a vehicle frame according to the present invention.

Another example embodiment of a mount according to the present invention, illustrated in FIG. 2, substantially corresponds to the example embodiment illustrated in FIG. 1. Parts having an identical function are denoted by the same reference numeral in FIGS. 1 and 2.

Second mount part 4 includes a hydraulic shock absorber configured to isolate the vibration between vehicle frame 3 and cab 1. A first chamber 23 filled with hydraulic fluid and a second chamber 25, which is separated from it, and is in fluid communication with first chamber 23, via a duct 24, are provided in first mount part 4. The volume of first chamber 23 is changed in response to a relative movement of inner and outer anchoring parts 7, 8 so that hydraulic fluid is moved in duct 24 between first chamber 23 and second chamber 25.

First chamber 23 and second chamber 25 are disposed between inner and outer anchoring parts 7, 8. First chamber 23 is bound by elastic spring element 9 and inner anchoring part 7. Duct 24 is in the form of an annular gap bounded by inner anchoring part 7 and outer anchoring part 8. A throttle element 26 is formed on outer anchoring part 8. Throttle element 26 is made of elastic material and is formed in one piece with elastic spring element 9. The elastic design also allows movements that are transverse with respect to lug axis 12 or vehicle center axis 6.

Throttle element 26 includes a substantially cylindrical section pointing toward second chamber 25, the bottom surface of the cylindrical section having an opening which, together with the inner anchoring part, forms the gap. This arrangement renders the resistance to hydraulic fluid passing from first chamber 23 into second chamber 25 lower than the resistance to hydraulic fluid passing from second chamber 25 into first chamber 23.

On one side, second chamber 25 is bounded by a section of inner anchoring part 7 radially enlarged in the external direction, and on the other side, it is bounded by elastic inner lower of wall 27. The latter is disposed between section 18 radially enlarged in the external direction, and flange 10 of outer anchoring part 8. Elastic inner wall 27 allows a variable amount of hydraulic fluid to be received in second chamber 25.

What is claimed is:

1. A mount for mounting a cab on a vehicle frame, the cab being movable relative to the vehicle frame between a driving position and a service position, comprising:

a first mounting part, the first mounting part including an inner anchoring part, an outer anchoring part and an elastic spring element, the outer anchoring part being movable with respect to the inner anchoring part and radially enclosing the inner anchoring part, the inner anchoring part including a receptacle, the elastic spring element being arranged to act between the inner anchoring part and the outer anchoring part;

a second mounting part, the first mounting part and the second mounting part being configured so that the second mounting part is accommodated in the receptacle when the cab is in the driving position and so that the first mounting part and the second mounting part are separable when the cab is moved from the driving position to the service position;

a vibration damper configured to act between the frame and the cab; and a centering device configured to align the first mounting part with respect to the second mounting part when the cab is moved into the driving position;

wherein one of the first mounting part and the second mounting part is configured to be provided on the cab and the other one of the first mounting part and the second mounting part is configured to be provided on the vehicle frame.

2. The mount according to claim 1, wherein the second mounting part is in the form of a lug, at least a section of the lug being configured to be accommodated in the receptacle.

3. The mount according to claim 1, wherein the centering device includes a first guide surface formed on the first mounting part and a second guide surface formed on the receptacle, the second guide surface being configured to interact with the first guide surface.

4. The mount according to claim 1, wherein the inner anchoring part includes a ring having an annular opening forming the receptacle.

5. The mount according to claim 1, further comprising a locking mechanism configured to secure the cab in the driving position.

6. The mount according to claim 5, wherein the locking mechanism includes a locking element configured to act between the second mounting part and the inner anchoring part.

7. A mount for mounting a cab on a vehicle frame, the cab being movable relative to the vehicle frame between a driving position and a service position, comprising:

a first mounting part, the first mounting part including an inner anchoring part, an outer anchoring part and an elastic spring element, the outer anchoring part being movable with respect to the inner anchoring part and radially enclosing the inner anchoring part, the inner anchoring part including a receptacle, the elastic spring element being arranged to act between the inner anchoring part and the outer anchoring part;

a second mounting part, the first mounting part and the second mounting part being configured so that the second mounting part is accommodated in the receptacle when the cab is in the driving position and so that the first mounting part and the second mounting part are separable when the cab is moved from the driving position to the service position;

a vibration damper configured to act between the frame and the cab; and a centering device configured to align the first mounting part with respect to the second mounting part when the cab is moved into the driving position;

wherein one of the first mounting part and the second mounting part is configured to be provided on the cab and the other one of the first mounting part and the second mounting part is configured to be provided on the vehicle frame;

wherein the centering device includes a first guide surface formed on the first mounting part and a second guide surface formed on the receptacle, the second guide surface being configured to interact with the first guide surface; and wherein at least one of the first guide surface and the second guide surface is inclined so that the second mounting part is centered upon insertion into the receptacle.

8. A mount for mounting a cab on a vehicle frame, the cab being movable relative to the vehicle frame between a driving position and a service position, comprising:

a first mounting part, the first mounting part including an inner anchoring part, an outer anchoring part and an elastic spring element, the outer anchoring part being movable with respect to the inner anchoring part and radially enclosing the inner anchoring part, the inner anchoring part including a receptacle, the elastic spring element being arranged to act between the inner anchoring part and the outer anchoring part;

a second mounting part, the first mounting part and the second mounting part being configured so that the second mounting part is accommodated in the receptacle when the cab is in the driving position and so that the first mounting part and the second mounting part are separable when the cab is moved from the driving position to the service position;

a vibration damper configured to act between the frame and the cab; and a centering device configured to align the first mounting part with respect to the second mounting part when the cab is moved into the driving position;

wherein one of the first mounting part and the second mounting part is configured to be provided on the cab and the other one of the first mounting part and the second mounting part is configured to be provided on the vehicle frame;

wherein the inner anchoring part includes a ring having an annular opening forming the receptacle; and wherein at least a section of the ring includes a diameter that decreases in an insertion direction of the second mounting part.

9. The mount according to claim 8, wherein the diameter decreases conically.

10. A mount for mounting a cab on a vehicle frame, the cab being movable relative to the vehicle frame between a driving position and a service position, comprising:

a first mounting part, the first mounting part including an inner anchoring part, an outer anchoring part and an elastic spring element, the outer anchoring part being movable with respect to the inner anchoring part and radially enclosing the inner anchoring part, the inner anchoring part including a receptacle, the elastic spring element being arranged to act between the inner anchoring part and the outer anchoring part;

a second mounting part, the first mounting part and the second mounting part being configured so that the second mounting part is accommodated in the receptacle when the cab is in the driving position and so that the first mounting part and the second mounting part are separable when the cab is moved from the driving position to the service position;

a vibration damper configured to act between the frame and the cab; and a centering device configured to align the first mounting part with respect to the second mounting part when the cab is moved into the driving position;

wherein one of the first mounting part and the second mounting part is configured to be provided on the cab and the other one of the first mounting part and the second mounting part is configured to be provided on the vehicle frame;

wherein the inner anchoring part includes a ring having an annular opening forming the receptacle; and wherein the ring, on a side facing the cab, includes a section that is radially enlarged in an external direction, the section forming a seat for a supporting body.

11. The mount according to claim 10, further comprising a locking mechanism configured to secure the cab in the driving position.

12. The mount according to claim 11, wherein the locking mechanism includes a locking element configured to grip the section from behind.

13. A mount for mounting a cab on a vehicle frame, the cab being movable relative to the vehicle frame between a driving position and a service position, comprising:

a first mounting part, the first mounting part including an inner anchoring part, an outer anchoring part and an elastic spring element, the outer anchoring part being movable with respect to the inner anchoring part and radially enclosing the inner anchoring part, the inner anchoring part including a receptacle, the elastic spring element being arranged to act between the inner anchoring part and the outer anchoring part;

a second mounting part, the first mounting part and the second mounting part being configured so that the second mounting part is accommodated in the receptacle when the cab is in the driving position and so that the first mounting part and the second mounting part are separable when the cab is moved from the driving position to the service position;

a vibration damper configured to act between the frame and the cab; and a centering device configured to align the first mounting part with respect to the second mounting part when the cab is moved into the driving position;

wherein one of the first mounting part and the second mounting part is configured to be provided on the cab and the other one of the first mounting part and the second mounting part is configured to be provided on the vehicle frame;

wherein the inner anchoring part includes a ring having an annular opening forming the receptacle; and wherein the ring, on a side opposite to the cab, includes a section that is radially enlarged in an external direction, the section and the outer anchoring part forming a break-away prevention mechanism.

14. A mount for mounting a cab on a vehicle frame, the cab being movable relative to the vehicle frame between a driving position and a service position, comprising:

a first mounting part, the first mounting part including an inner anchoring part, an outer anchoring part and an elastic spring element, the outer anchoring part being movable with respect to the inner anchoring part and radially enclosing the inner anchoring part, the inner anchoring part including a receptacle, the elastic spring element being arranged to act between the inner anchoring part and the outer anchoring part;

a second mounting part, the first mounting part and the second mounting part being configured so that the second mounting part is accommodated in the receptacle when the cab is in the driving position and so that the first mounting part and the second mounting part are separable when the cab is moved from the driving position to the service position;

a vibration damper configured to act between the frame and the cab;

a centering device configured to align the first mounting part with respect to the second mounting part when the cab is moved into the driving position;

a hydraulic shock absorber disposed between the first mounting part and the second mounting part;

wherein one of the first mounting part and the second mounting part is configured to be provided on the cab and the other one of the first mounting part and the second mounting part is configured to be provided on the vehicle frame.

15. The mount according to claim 14, wherein the hydraulic shock absorber includes a first chamber filled with hydraulic fluid, a second chamber separated from the first chamber and a duct, the second chamber being in fluid communication with the first chamber via the duct, the first chamber, the second chamber and the duct being configured for hydraulic damping;

wherein in response to a relative movement of the inner anchoring part and the outer anchoring part, a volume of the first chamber is changeable so that the hydraulic fluid is moved in the duct between the first chamber and the second chamber.

16. The mount according to claim 15, wherein at least one of the first chamber and the second chamber is arranged between the inner anchoring part and the outer anchoring part.

17. The mount according to claim 15, wherein the first chamber is at least sectionally bounded by the elastic spring element.

18. The mount according to claim 15, wherein the duct is formed by a gap bounded by the inner anchoring part and the outer anchoring part.

19. The mount according to claim 18, wherein the outer anchoring part includes a throttle element extending around the inner anchoring part, the throttle element forming the gap.

20. The mount according to claim 19, wherein the throttle element is formed of an elastic material.

21. The mount according to claim 20, wherein the throttle elements is integrally formed with the elastic spring element.

22. The mount according to claim 19, wherein the throttle element includes a substantially cylindrical section extending toward the second chamber, a bottom surface of the cylindrical section having an opening, the opening and the inner anchoring part forming a boundary of the gap.

* * * * *